US008872835B2

(12) United States Patent
Malakapalli et al.

(10) Patent No.: US 8,872,835 B2
(45) Date of Patent: Oct. 28, 2014

(54) PREVENTION OF DOS ATTACK BY A ROGUE GRAPHICS APPLICATION

(75) Inventors: Meher P Malakapalli, Sammamish, WA (US); B. Anil Kumar, Saratoga, CA (US); Parag Chakraborty, Sunnyvale, CA (US); Karthik Lakshminarayanan, Cupertino, CA (US); Mahesh Lotlikar, Sammamish, WA (US); Bradley Stephen Post, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 12/893,985

(22) Filed: Sep. 29, 2010

(65) Prior Publication Data

US 2012/0075314 A1  Mar. 29, 2012

(51) Int. Cl.
G06T 15/00 (2011.01)
G06T 1/20 (2006.01)
G06F 21/53 (2013.01)
G06F 21/84 (2013.01)
G06F 9/455 (2006.01)

(52) U.S. Cl.
CPC . *G06T 1/20* (2013.01); *G06F 21/53* (2013.01); *G06F 21/84* (2013.01); *G06F 2009/45587* (2013.01)
USPC .............................................. 345/522; 718/1

(58) Field of Classification Search
USPC .............................................. 345/522; 718/1
See application file for complete search history.

(56) References Cited

U.S. PATENT DOCUMENTS

| 6,115,054 | A | * | 9/2000 | Giles ............................ 345/522 |
| 7,694,338 | B1 | | 4/2010 | Jafari et al. |
| 7,711,000 | B2 | | 5/2010 | Hu et al. |
| 7,802,147 | B1 | * | 9/2010 | Johnson et al. ................ 714/41 |
| 7,970,789 | B1 | * | 6/2011 | Blaser et al. .................. 707/783 |
| 2005/0210158 | A1 | * | 9/2005 | Cowperthwaite et al. ........ 710/1 |
| 2006/0206300 | A1 | | 9/2006 | Garg et al. |
| 2007/0157300 | A1 | | 7/2007 | Sivaradjane et al. |
| 2008/0005360 | A1 | | 1/2008 | Belgaied et al. |
| 2008/0209429 | A1 | * | 8/2008 | Van Riel et al. .............. 718/104 |
| 2008/0250419 | A1 | * | 10/2008 | Kasten et al. ................. 718/104 |
| 2008/0320585 | A1 | | 12/2008 | Ansari et al. |
| 2010/0077395 | A1 | | 3/2010 | Edwards et al. |
| 2010/0201695 | A1 | * | 8/2010 | Hill et al. ...................... 345/503 |

OTHER PUBLICATIONS

"Timeout Detection and Recovery of GPUs", www.msdn.microsoft.com-en-us-library-ff570088(VS.85).aspx, accessed Aug. 27, 2010, 1 page.
Jin, "Visualization of Network Traffic to Detect Malicious Network Activity", Norwegian University of Science and Technology, Department of Telematics, Jul. 2008, 115 pages.

* cited by examiner

Primary Examiner — Maurice L McDowell, Jr.
(74) Attorney, Agent, or Firm — Jim Sfekas; Kate Drakos; Micky Minhas

(57) ABSTRACT

A mechanism is described for mitigating the effects of such a DoS attack by detecting a multiple TDR situation within a short duration, identifying the errant virtual machines, and suspending all rendering ability for that virtual machine or set of virtual machines. While the disclosed embodiments are described in the context of virtual machines, the principles may be extended to the general problem of DoS attacks due to TDRs and bugchecks on any physical machine that includes a GPU. For example, DoS attacks can be generated from web sites directly using GPU rendering.

20 Claims, 13 Drawing Sheets

PREVENTION OF DOS ATTACK BY A ROGUE GRAPHICS APPLICATION

BACKGROUND

A common stability problem that occurs when rendering graphics occurs when the system appears frozen or hung while processing an end-user command or operation. Users may wait for a few seconds, determine that the system is frozen, and then perform a hard reboot of the system by pressing and holding the power button. In many cases the system appears to be frozen because the graphics processing unit (GPU) is busy processing intensive graphical operations such as during video gameplay. When the GPU is busy in this way, the effect may be that the screen is not updated, thus appearing to the user that the system is frozen.

Some systems may implement a timeout detection and recovery (TDR) process. Mechanisms such as a TDR may be used in any environment in which a GPU is used and can be subject to an intensive operation and a timeout mechanism is useful to determine whether to restart the GPU.

SUMMARY

A malicious or a rogue application executing in one or more virtual machines can cause a TDR on a host GPU. Some systems may reset the system in the case of multiple TDRs. For example, more than five TDRs within a period of one minute may result in a system bugcheck. A malicious user may launch a denial of service (DoS) attack by causing multiple TDRs that would cause multiple or continuous system bugchecks.

Disclosed herein is a mechanism for mitigating the effects of such a DoS attack by detecting a multiple TDR situation within a short duration. On a hypervisor system hosting one or more virtual machines, the mitigation involves identifying the errant virtual machine or virtual machines and suspending all rendering ability for that virtual machine or set of virtual machines. While the disclosed embodiments are described in the context of virtual machines, the principles may be extended to the general problem of DoS attacks due to TDRs and bugchecks on any physical machine that includes a GPU. For example, DoS attacks can be generated from web sites directly using GPU rendering.

BRIEF DESCRIPTION OF THE DRAWINGS

The systems, methods, and computer readable media for preventing a reset of a errant processes due to graphics accelerator timeouts in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
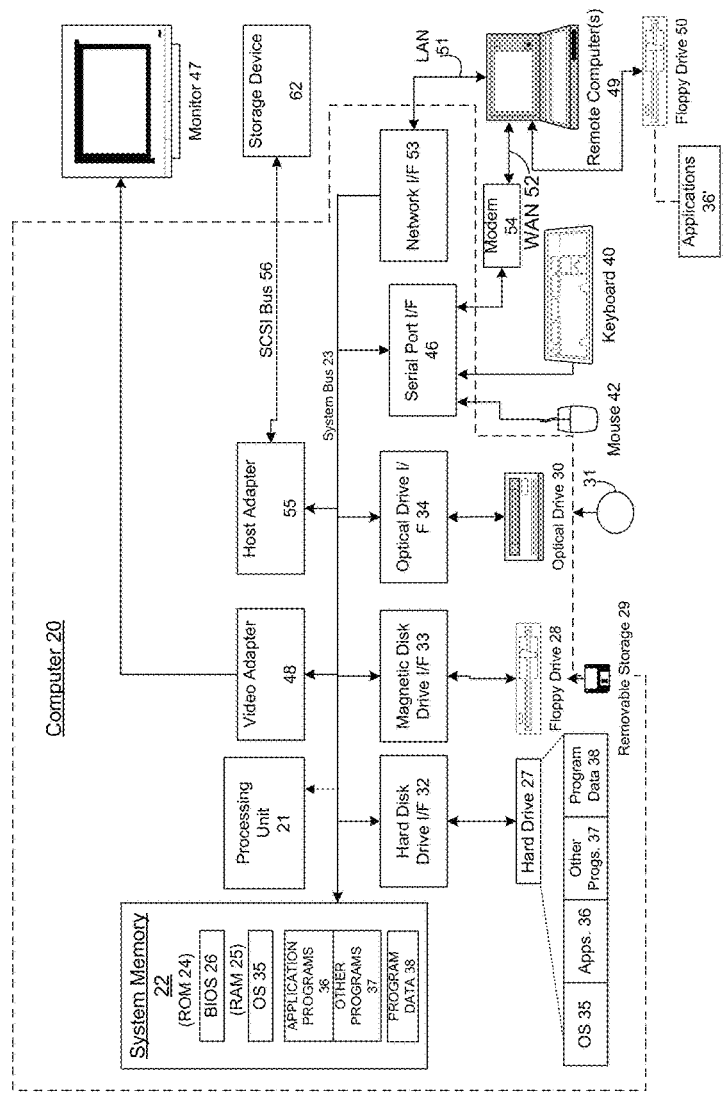
FIGS. 1 and 2 depict an example computer system wherein aspects of the present disclosure can be implemented.
Figure 2:
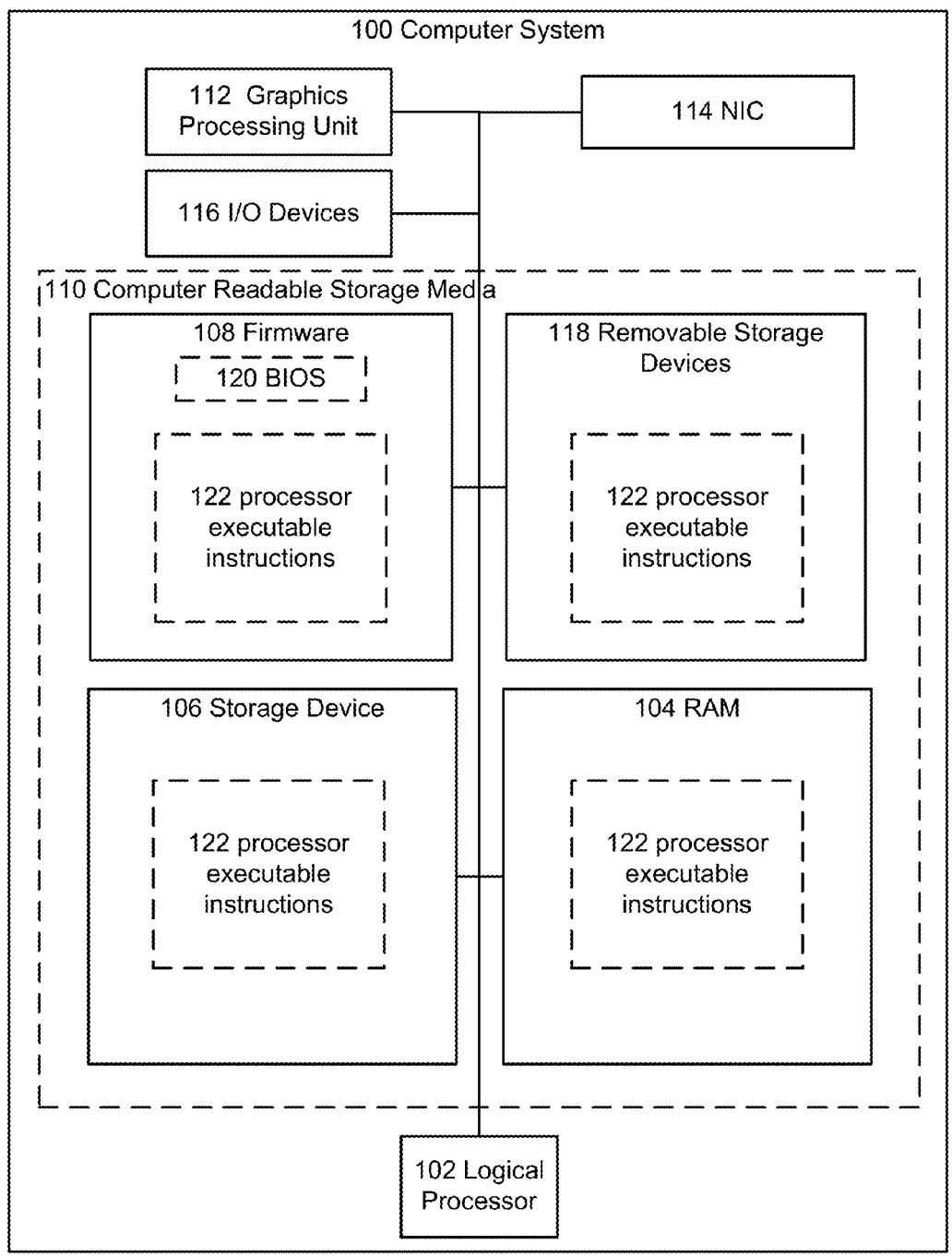

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adapters, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
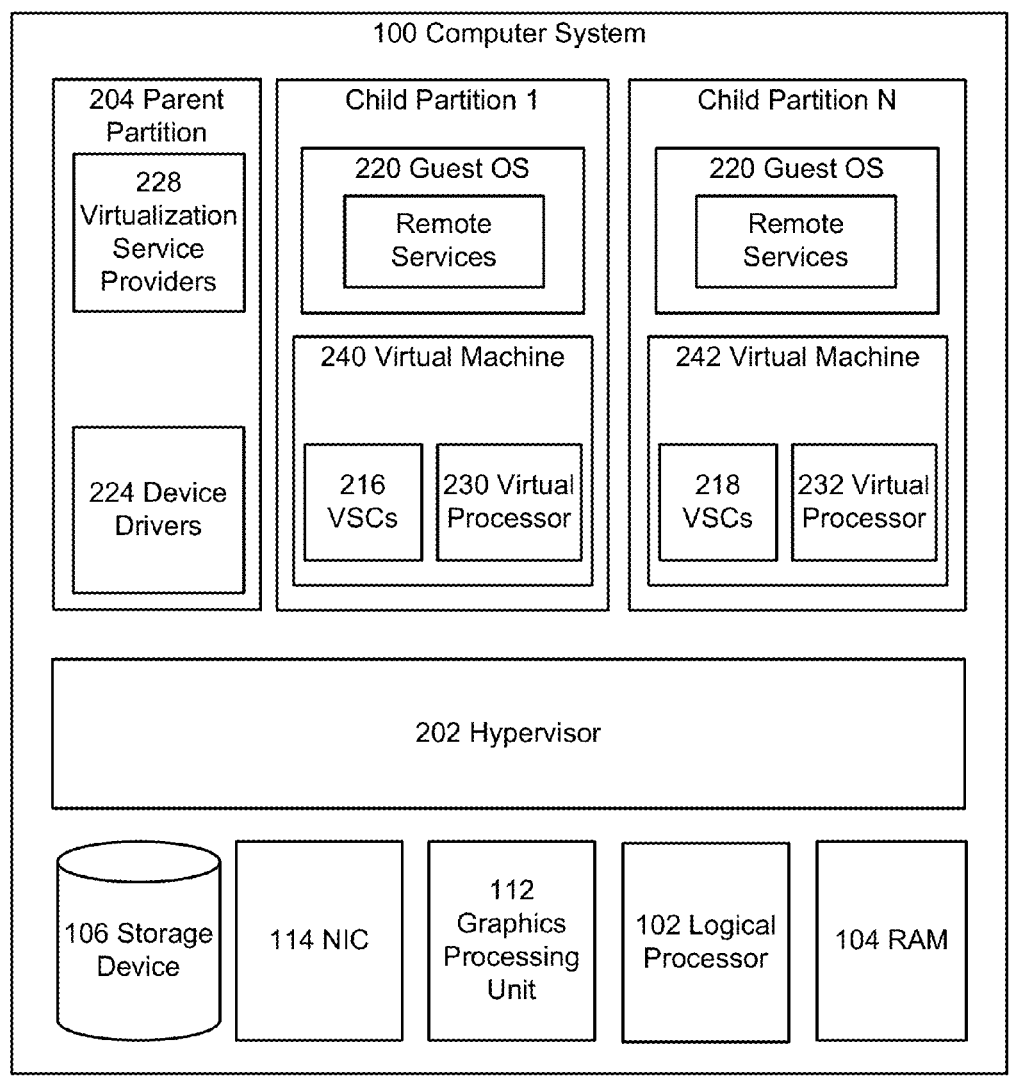
FIG. 3 depicts an operational environment for practicing aspects of the present disclosure.
Figure 4:
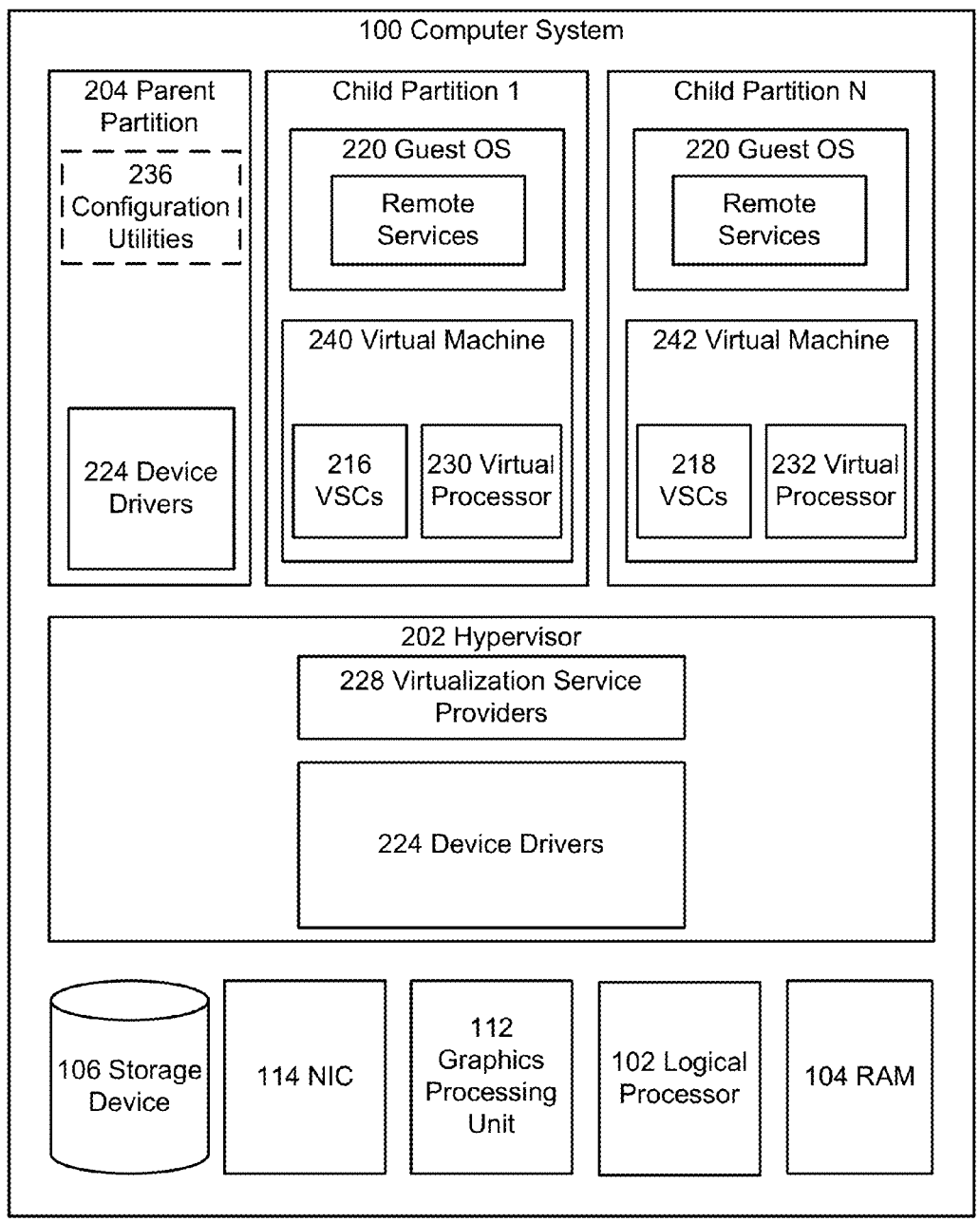
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
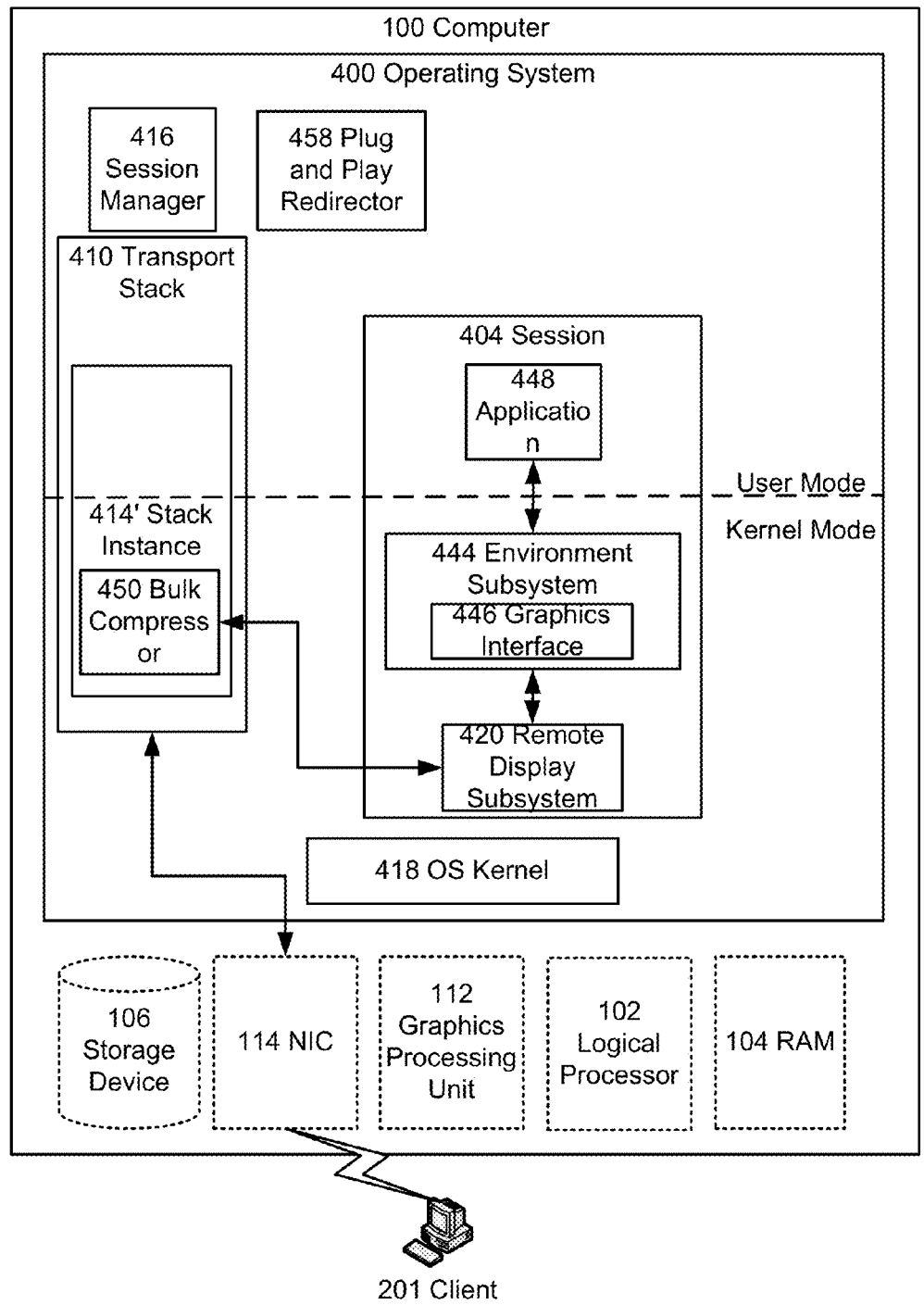
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as virtual machine 216 or virtual machine 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
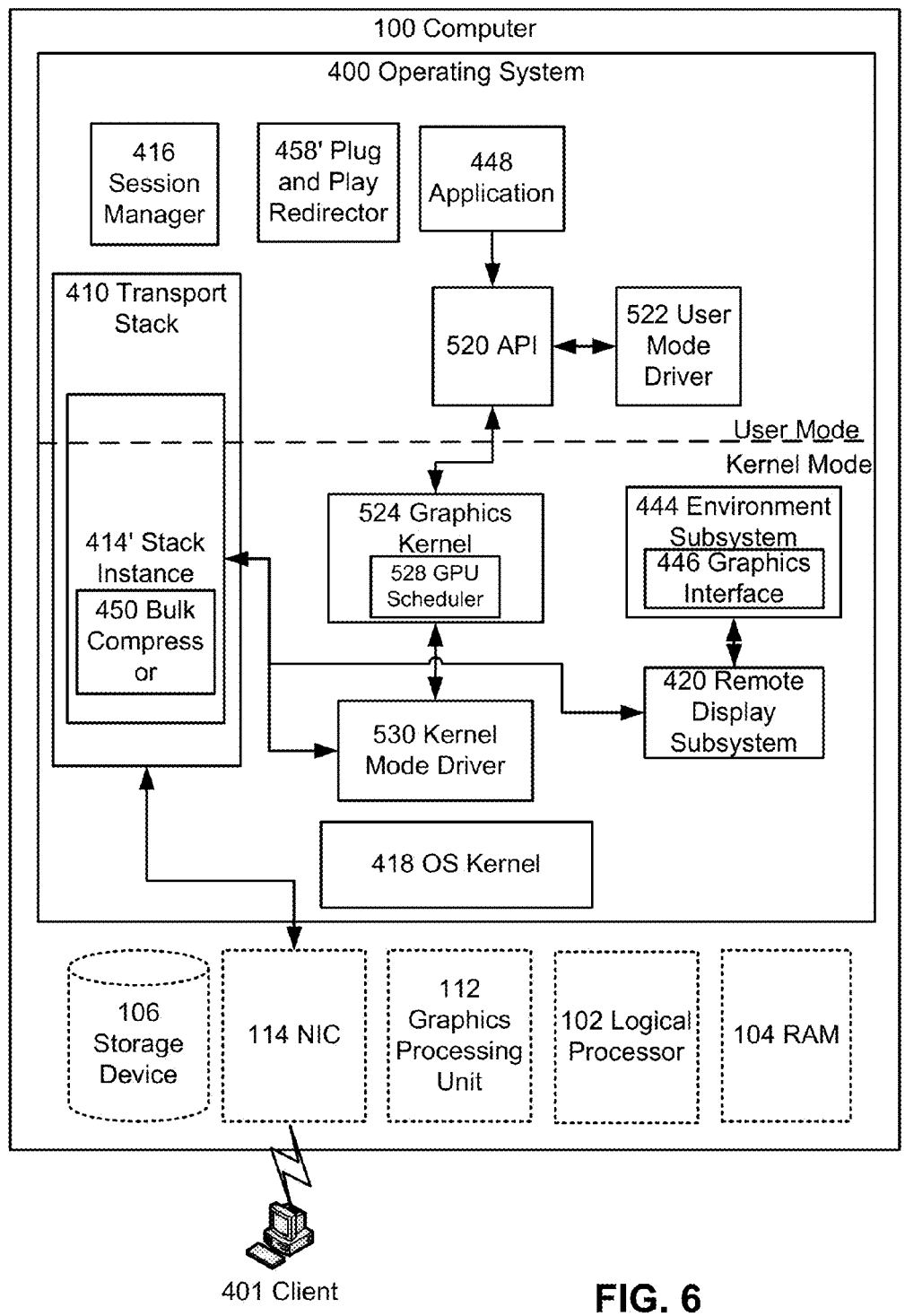
FIG. 6 illustrates a computer system including circuitry for effectuating remote desktop services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

GPUs in Virtualized Environments

A graphics processing unit or GPU is a specialized processor that offloads 3D graphics rendering from the microprocessor. A GPU may provide efficient processing of mathematical operations commonly used in graphics rendering by implementing various graphics primitive operations. A GPU may provide faster graphics processing as compared to the host CPU. A GPU may also be referred to as a graphic accelerator.

Graphics applications may use Application Programming Interfaces (APIs) to configure the graphics processing pipeline and provide shader programs which perform application specific vertex and pixel processing on the GPU. Many graphics applications interact with the GPU using an API such as Microsoft's DirectX or the OpenGL standard.

As described above, virtualization operates by multiplexing physical hardware by presenting each virtual machine with a virtual device and combining their respective operations in the hypervisor or virtual machine monitor such that hardware resources are used while maintaining the perception that each virtual machine has a complete standalone hardware resource. As discussed, a virtual machine monitor (virtual machineM) or hypervisor is a software system that may partition a single physical machine into multiple virtual machines.

A virtual machine may render into a virtual device via the virtual GPU device driver. The actual rendering may be accomplished by accelerating the rendering using a single or multiple GPU controllers in another virtual machine (the parent virtual machine) or on a remote machine (that acts as a graphics server) that is shared by many guest virtual machines. An image capture component on the parent virtual machine may retrieve snapshots of the desktop images. The captured images can be optionally compressed and encoded prior to transmitting to the client. The compression and encoding can take place on the parent virtual machine or the child or guest virtual machine. A remote presentation protocol such as Remote Desktop Protocol (RDP) may be used to connect to the virtual machines from remote clients and for transmitting the desktop images. In this manner, a remote user can experience graphical user interfaces such as Windows Aero and execute 3D applications and multimedia via a remote login.

The virtualization scheme may based on one or both of two modes. In one embodiment, a user mode driver may provide for a virtualization boundary higher in the graphics stack, and a kernel mode driver may provide a virtualization boundary lower in the graphics stack. In one embodiment, the virtual GPU subsystem may comprise a display driver that further comprises user mode and kernel mode components that execute on the virtual machines, and the render component of the render/capture/compress process that executes on the parent partition. In an embodiment, the display driver may be a Windows Display Driver Model (WDDM) driver.

Driver calls on the virtual machine may be translated to API calls on the host or parent partition. For example, one set of APIs may be the Microsoft DirectX set of APIs for handling tasks related to multimedia, in particular Direct3D which is the 3D graphics API within DirectX. By providing such a virtualization infrastructure, the concurrent use of a single physical GPU by multiple virtual machines may be enabled and the virtual machines may be exposed to 3D and multimedia capabilities. Multiple virtual machines may then accelerate 3D rendering tasks on a single or multiple GPUs in the host machine.

Figure 10:
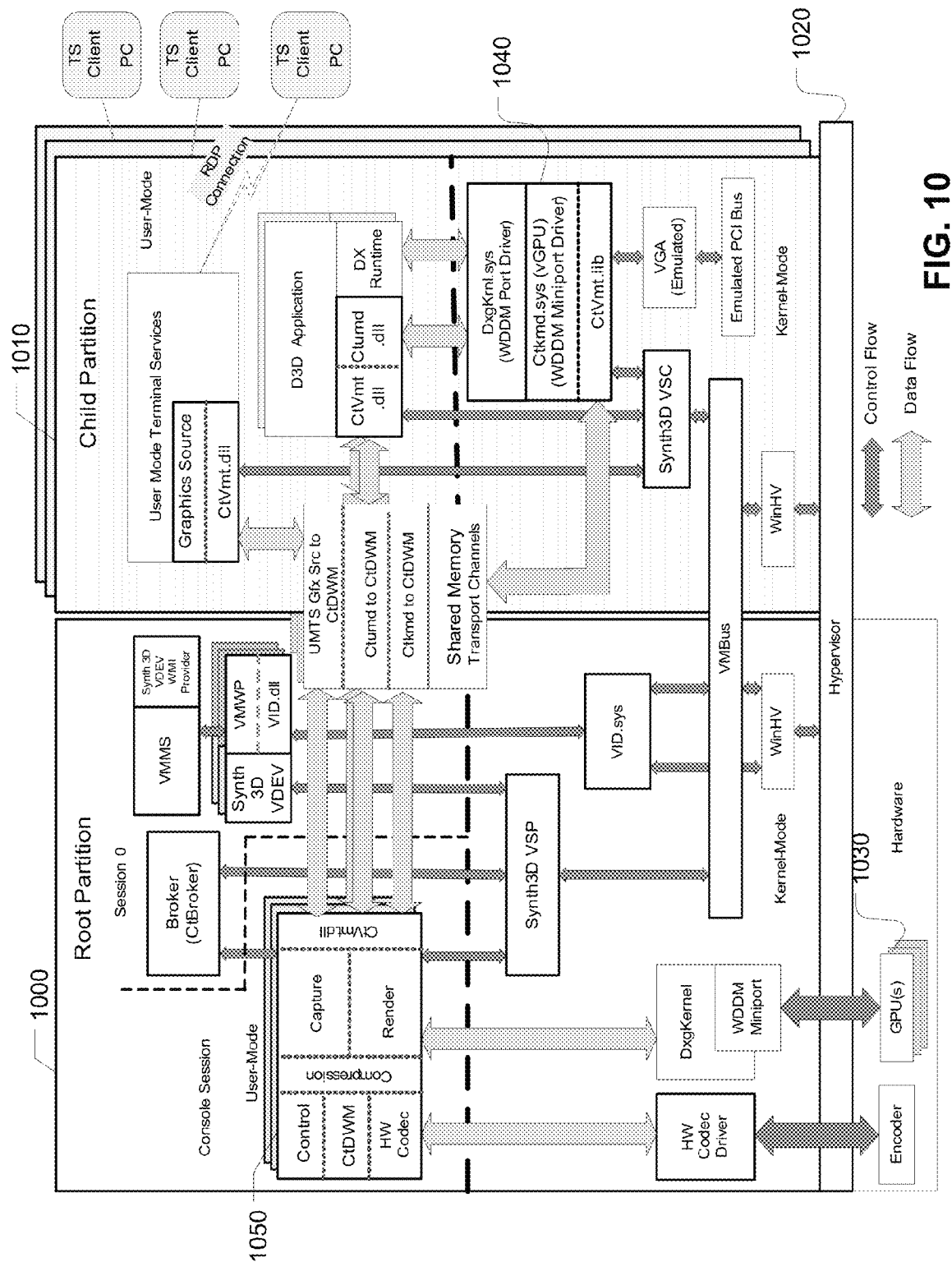
FIG. 10 illustrates an example architecture incorporating aspects of the methods disclosed herein.

FIG. 10 illustrates an exemplary embodiment of a virtual machine scenario for implement a virtual GPU as a component in a VDI scenario. In this example, the VDI may provide 3D graphics capability for each child virtual machine 1010 instantiated by the hypervisor 1020 on a server platform. Each child virtual machine 1010 may load a virtual GPU driver 1040. The system may be populated with GPU accelerator(s) 1030 which are accessible from the parent or root partition 1000. The physical GPUs 1030 on the parent or root partition 1000 (also known as a GVM—Graphics Virtual Machine) may be shared by the different child virtual machines 1010 to perform graphics rendering operations.

The virtual GPU subsystem may virtualize the physical GPU and provide accelerated rendering capability for the virtual machines. The virtual GPU driver may, in one embodiment, be a WDDM driver 1040. The driver may remote corresponding commands and data to the parent partition for rendering. A rendering process, which may be part of a render/capture/compress subsystem 1050, may perform the corresponding rendering on the GPU. For each virtual machine, there may be provided a corresponding render/capture/compress component 1050 on the host or parent partition 1000. WDDM drivers allow video memory to be virtualized, with video data being paged out of video memory into system RAM.

On request by a graphics source sub-system running on the child virtual machine, the render/capture/compress subsystem may return compressed or uncompressed screen updates as appropriate. The screen updates may be based on the changed rectangle size and the content. The virtual GPU driver may support common operating systems such as Vista and Windows 7.

The virtual GPU subsystem may virtualize the physical GPU and provide accelerated rendering capability for the virtual machines. The virtual GPU driver may, in one embodiment, be a WDDM driver. The driver may remote corresponding commands and data to the parent partition for rendering. A rendering process, which may be part of a render/capture/compress subsystem, may perform the corresponding rendering on the GPU. For each virtual machine, there may be provided a corresponding render/capture/compress component on the host or parent partition. WDDM drivers allow video memory to be virtualized, with video data being paged out of video memory into system RAM.

On request by a graphics source sub-system running on the child virtual machine, the render/capture/compress subsystem may return compressed or uncompressed screen updates as appropriate. The screen updates may be based on the changed rectangle size and the content. The virtual GPU driver may support common operating systems such as VISTA and WINDOWS 7.

As discussed, some embodiments may incorporate a WDDM driver. A WDDM driver acts as if the GPU is a device configured to draw pixels in video memory based on commands stored in a direct memory access (DMA) buffer. DMA buffer information may be sent to the GPU which asynchronously processes the data in order of submission. As each buffer completes, the run-time is notified and another buffer is submitted. Through execution of this processing loop, video images may be processed and ultimately rendered on the user screens. Those skilled in the art will recognize that the disclosed subject matter may be implemented in systems that use OpenGL and other products.

DMA buffer scheduling may be driven by a GPU scheduler component in the kernel mode. The GPU scheduler may determine which DMA buffers are sent to the GPU and in what order.

The user mode driver may be configured to convert graphic commands issued by the 3D run-time API into hardware specific commands and store the commands in a command buffer. This command buffer may then be submitted to the run-time which in turn calls the kernel mode driver. The kernel mode driver may then construct a DMA buffer based on the contents of the command buffer. When it is time for a DMA buffer to be processed, the GPU scheduler may call the kernel mode driver which handles all of the specifics of actually submitting the buffer to the GPU hardware.

The kernel mode driver may interface with the physical hardware of the display device. The user-mode driver comprises hardware specific knowledge and can build hardware specific command buffers. However, the user-mode driver does not directly interface with the hardware and may rely on the kernel mode driver for that task. The kernel mode driver may program the display hardware and cause the display hardware to execute commands in the DMA buffer.

In one embodiment, all interactions with the host or parent partition may be handled through the kernel mode driver. The kernel mode driver may send DMA buffer information to the parent partition and make the necessary callbacks into the kernel-mode API run-time when the DMA buffer has been processed. When the run-time creates a graphics device context, the run-time may call a function for creating a graphics device context that holds a rendering state collection. In one embodiment, a single kernel-mode connection to the parent partition may be created when the first virtual graphics device is created. Subsequent graphics devices may be created with coordination from the user mode device and the connection to the parent partition for those devices may be handled by the user mode device.

In another embodiment, a connection to the host or parent partition may be established each time the kernel-mode driver creates a new device. A connection context may be created and stored in a per-device data structure. This connection context may generally consist of a socket and I/O buffers. Since all communication with the parent partition goes through the kernel-mode driver, this per device connection context may help ensure that commands are routed to the correct device on the host or parent partition.

In one embodiment, a separate thread may be provided on the host or parent partition for each running instance of the user mode device. This thread may be created when an application creates a virtual device on the child partition. An additional rendering thread may be provided to handle commands that originate from the kernel mode on the child partition (e.g., kernel mode presentations and mouse pointer activity).

In one embodiment, the number of rendering threads on the parent partition may be kept at a minimum to match the number of CPU cores.

Additional tasks may be performed when managing a GPU. For example, in addition to providing graphics primitives, the hardware context for the GPU may be maintained. Pixel shaders, vertex shaders, clipping planes, scissor rectangles and other settings that affect the graphics pipeline may be configured. The user mode driver may also determine the logical values for these settings and how the values translate into physical settings.

In one embodiment, the user mode driver may be responsible for constructing hardware contexts and command buffers. The kernel mode driver may be configured to convert command buffers into DMA buffers and provide the information to the GPU when scheduled by the GPU scheduler.

The virtual GPU may be implemented across several user mode and kernel mode components. In one embodiment, a virtual machine transport (VMT) may be used as a protocol to send and receive requests across all the components. The VMT may provide communication between modules that span two or more partitions. Since there are multiple components in each partition that communicate across the partitions, a common transport may be defined between the components.

Figure 7:
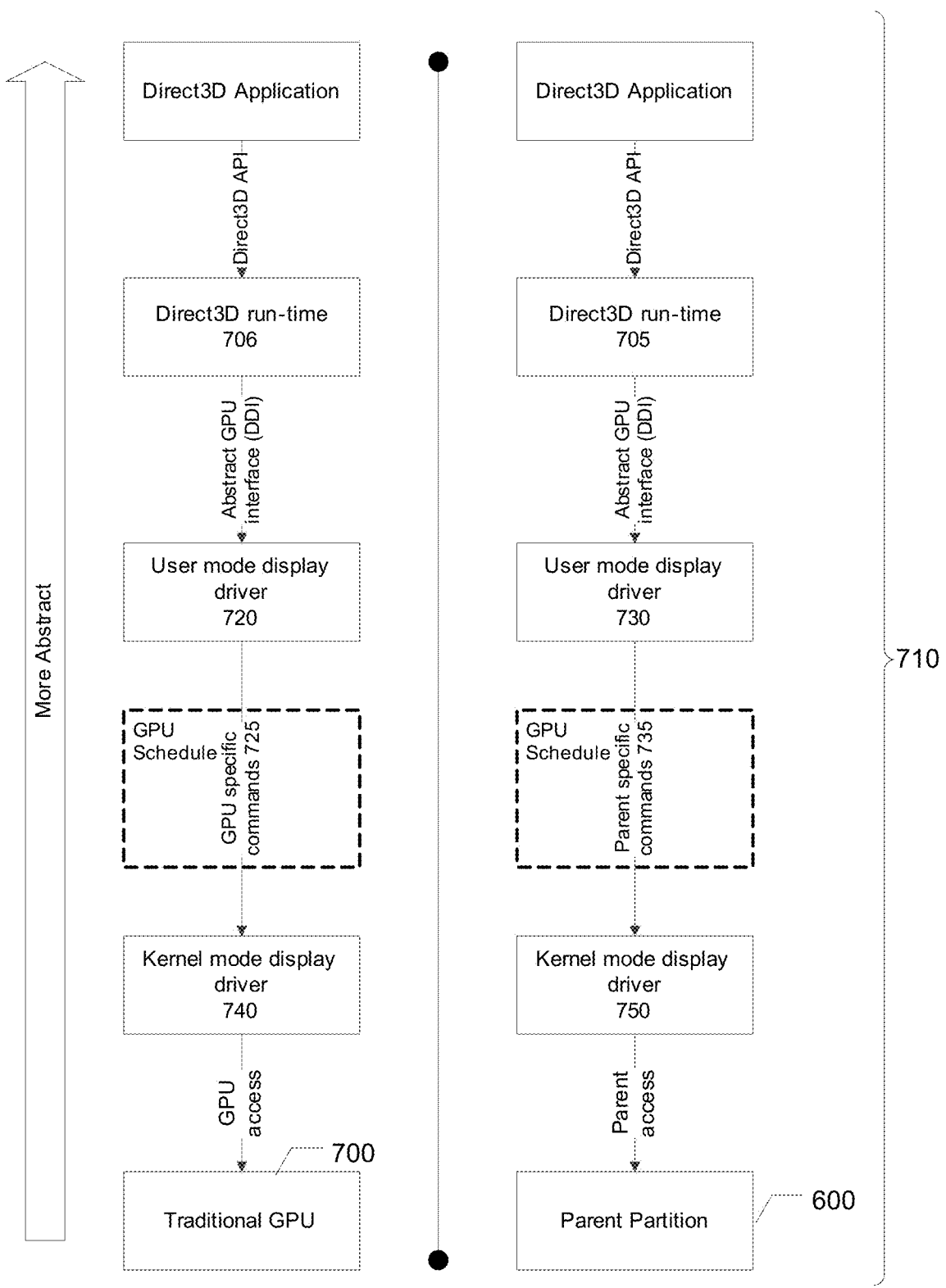
FIG. 7 illustrates example abstraction layers of a virtualized GPU.

FIG. 7 depicts the layers of abstraction in a traditional driver and those in one exemplary embodiment of a virtual GPU driver. Like a traditional GPU 700, the parent partition 600 can be viewed as being situated at the bottom of the driver stack 710. The parent partition 600 represents the graphics hardware and abstracts the interfaces of a traditional GPU 700 as if the GPU were present in the virtual machine. The virtual GPU driver thus provides access to the parent partition within the constraints of the driver model.

The display driver 740 may receive GPU specific commands 725 and may be written to be hardware specific and control the GPU 700 through a hardware interface. The display driver 740 may program I/O ports, access memory mapped registers, and otherwise interact with the low level operation of the GPU device. The virtual GPU driver 750 may receive parent partition specific commands 735 and may be written to a specific interface exposed by the parent partition 600. In one embodiment, the parent partition may be a Direct3D application running on a different machine, and the parent partition may act as a GPU that natively executes Direct3D commands. In this embodiment, the commands that the user mode display driver 730 receives from the Direct3D run-time 705 can be sent to the parent partition 600 unmodified.

Figure 8:
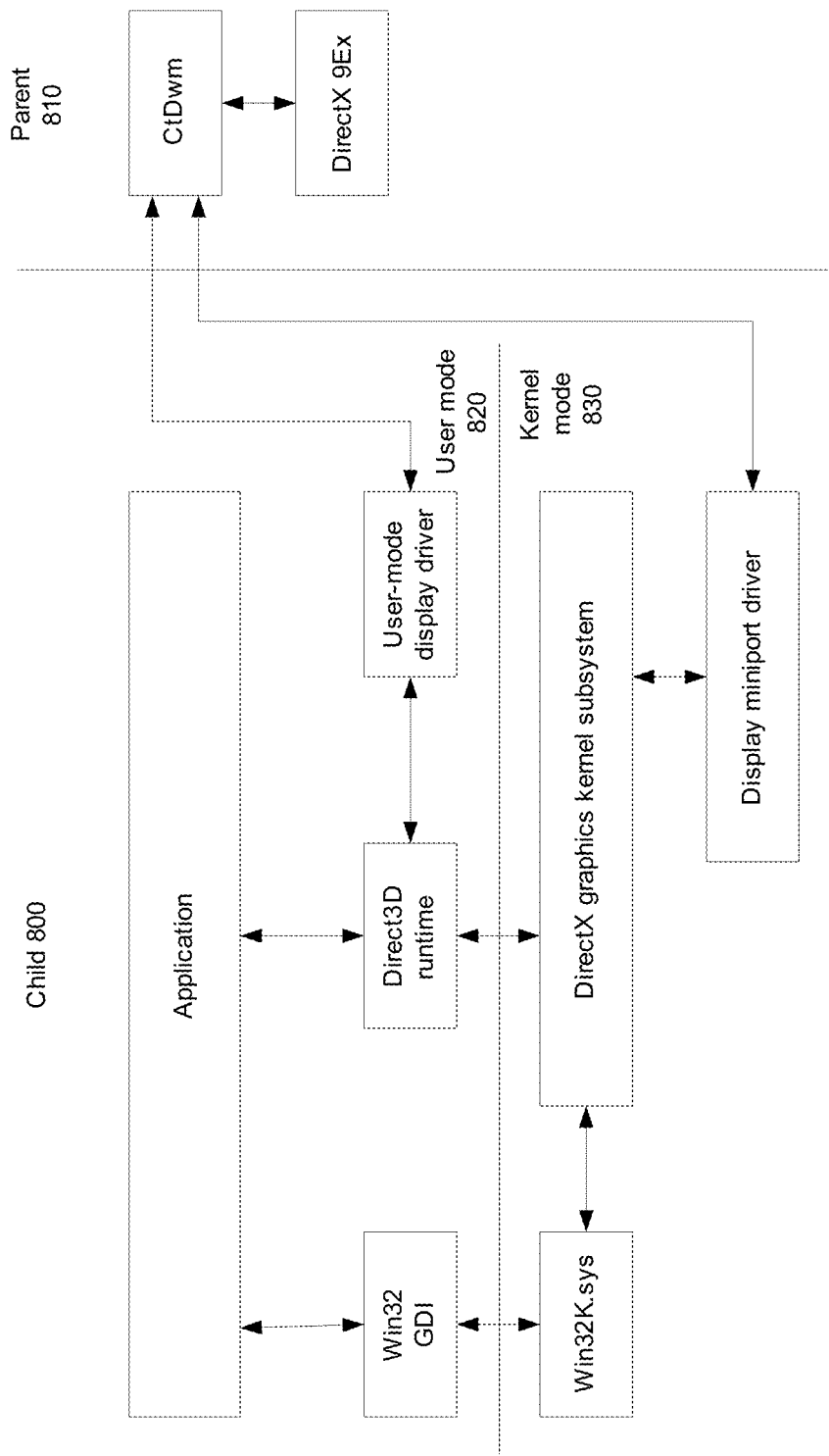
FIG. 8 illustrates an example architecture incorporating aspects of the methods disclosed herein.

As shown in FIG. 8, in one embodiment, the Direct3D commands on the child partition 800 may be encoded in the user mode driver 820 and the kernel mode driver 830 and sent along with the data parameters to the parent partition 810. On the parent partition 810, a component may render the graphics by using the hardware GPU.

Figure 9:
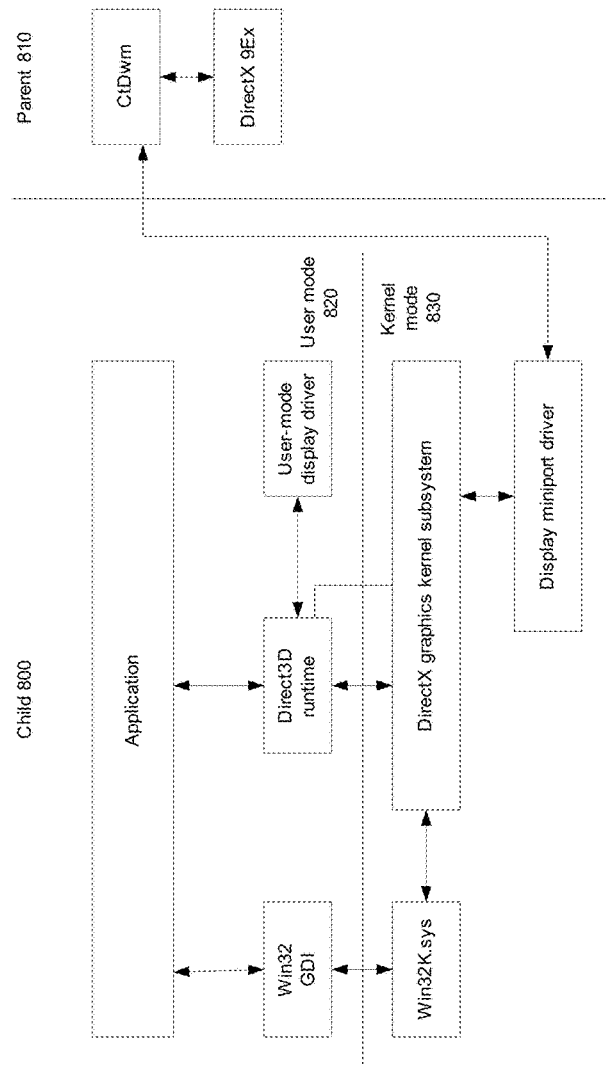
FIG. 9 illustrates an example architecture incorporating aspects of the methods disclosed herein.

In another embodiment depicted in FIG. 9, the Direct3D commands on the child partition 800 may be sent to the user mode driver 820 and the kernel mode driver 830. The commands may be interpreted/adapted in the kernel mode driver 830 and placed in DMA buffers in the kernel mode. The parent partition 810 may provide virtual GPU functionality, and command buffers may be constructed by the user mode driver 820. The command buffer information may be sent to the kernel mode driver 830 where they may be converted into DMA buffers and submitted to the parent partition 810 for execution. On the parent partition, a component may render the commands on the hardware GPU.

When an application requests execution of a graphics processing function, the corresponding command and video data may be made available to a command interpreter function. For example, a hardware independent pixel shader program may be converted into a hardware specific program. The translated command and video data may be placed in the parent partition work queue. This queue may then be processed and the pending DMA buffers may be sent to the parent partition for execution. When the parent partition receives the commands and data, the parent partition may use a Direct3D API to convert the commands/data into a form that is specific to the parent partition's graphics hardware.

Thus, in the child partition a GPU driver may be provided that conceptually looks to each virtual machine as a real graphics driver but in reality causes the routing of the virtual machine commands to the parent partition. On the parent partition the image may be rendered using the real GPU hardware.

In one illustrative embodiment depicted in FIG. 10, a synthetic 3D video device may be exposed to the virtual machine and the virtual machine may search for drivers that match the video device. A virtual graphics display driver may be provided that matches the device, which can be found and loaded by the virtual machine. Once loaded, the virtual machine may determine that it can perform 3-D tasks and expose the device capabilities to the operating system which may use the functions of the virtualized device.

The commands received by the virtual machine may call the virtual device driver interface. A translation mechanism may translate the device driver commands to DirectX commands. The virtual machine thus believes it has access to a real GPU that calls the DDI and device driver. The device driver calls coming in are received and translated, the data is received, and on the parent side the DDI commands may be re-created back into the DirectX API to render what was supposed to be rendered on the virtual machine. In some instances, converting DDI commands into DirectX API commands may be inefficient. In other embodiments, the DirectX API may be circumvented and the DDI commands may be converted directly into DDI commands on the host partition. In this embodiment, the DirectX subsystem may be configured to allow for this circumvention.

In another embodiment, only one connection may be established to the parent partition and communication with the graphics device contexts can be multiplexed over one communication channel. While there is typically a one to one mapping of graphics devices from the child partition to the parent partition, in this embodiment the communication channel is not associated with any particular graphics device. A "select device" token may be sent before sending commands that are destined for a particular device. The "select device" token indicates that all subsequent commands should be routed to a particular graphics device. A subsequent "select device" token may be sent when graphics commands should to be sent to a different device.

Alternatively, in another embodiment only one graphics device may available on the parent partition. Here, a many-to-one mapping of devices from the child partition to devices on the parent partition may be implemented. The correct GPU state may be sent before sending commands associated with a particular graphics device. In this scenario, the GPU state is maintained by the child partition instead of the parent partition. In this embodiment the illusion that multiple graphics device contexts exist on the child partition is created, but in reality all are processed by one graphics device context on the parent partition that receives the correct GPU state before processing commands associated with a given child partition graphics device context.

Remote FX is an example of a remote presentation feature that enables a virtual desktop environment to client users. Such technologies enables the delivery of a full client user experience to a range of client devices. RemoteFX does this via a technique known as host-based rendering where graphics are rendered on the host device instead of the client device. RemoteFX exposes a WDDM driver with the virtual desktop, while allowing multiple virtual desktops to share a single GPU on a Hyper-V server.

Thus in various embodiments, a GPU may be abstracted and device driver calls on a virtual machine may be sent to a parent or host partition (GVM) where the commands are translated to use the API of the graphics server. Before sending to the parent partition, the device driver calls may be converted into intermediate commands and data before they are sent to the parent partition and converted to the application level API. The intermediate stages may be implementation specific and depend on the particular hardware being used.

Using the above described techniques, a stable virtual GPU can be synthesized and a given virtual machine need not be concerned with the particular piece of hardware that sits underneath as long as the minimum requirements are met by the underlying device. For example, in one situation the parent partition may by using an NVIDIA GPU and in another case the parent partition may be using an ATI device. In either case, a virtual set of capabilities may be exposed as long as the underlying GPU provides a minimal predetermined set of capabilities. The application running on the virtual machine operates as though the WDDM driver has a stable set of features. The virtual machine may be saved and migrated to another system using a different GPU without affecting the application using the GPU services.

In the GPU scenarios described above, 3D graphics may be used. 3D graphics uses modeling via the wireframe representation of three-dimensional objects that may be displayed as a two-dimensional image using various 3D rendering techniques. Such techniques may, for example, represent a 3D object using a collection of points in 3D space connected by a geometric entity such as a triangle. When a scene in a video application is set up, the various virtual objects, the viewer's perspective, color, and lighting may be considered in generating a still image or an animation. Typically, the 3D model's vertices are colored and that color may then be interpolated across the model's surface during rendering. One method of adding color information to a 3D model is by applying a 2D texture image to the model's surface using texture mapping. Textures may add detail, surface texture, or color to a computer-generated graphic or 3D model. Vertex geometry information (vertex buffers) may comprise texture coordinates that indicate how to map the points of the texture image map to the 3D model's surface. The texture may be mapped to the surface of a shape such as a triangle that is typically used in 3D modeling. Additionally, shaders may perform complex calculations to fetch from arbitrary locations within any number of textures.

3D applications typically require a significant amount of texture data to produce good quality scenes. The amount of texture data in turn requires a significant amount of space in memory and on the storage medium (e.g., hard disk or optical disk).

Prevention of Dos Attack by a Rogue Graphics Application

A common stability problem that occurs when rendering graphics occurs when the system appears frozen or hung while processing an end-user command or operation. Users may wait for a few seconds, determine that the system is frozen, and then perform a hard reboot of the system by pressing and holding the power button. In many cases the system appears to be frozen because the GPU is busy processing intensive graphical operations such as during video gameplay. When the GPU is busy in this way, the effect may be that the screen is not updated, thus appearing to the user that the system is frozen.

Some systems may attempt to detect these problematic hanging situations and recover a responsive desktop dynamically. In such a process in the Windows environment, for example, the Windows Display Driver Model (WDDM) driver may be reinitialized and the GPU may be reset. A system reboot is not necessary, which greatly enhances the user experience. One visible artifact from the hang detection and recovery is a screen flicker which results from resetting some portions of the graphics stack which may cause a screen redraw. Some operating systems may indicate a graphics driver reset by presenting a notification to the end user. Some DirectX applications may render to a black screen at the end of this recovery. The end user would have to restart these applications.

Some systems may implement a timeout detection and recovery (TDR) process. Mechanisms such as a TDR may be used in any environment in which a GPU is used and can be subject to an intensive operation and a timeout mechanism is useful to determine whether to restart the GPU.

One example of a TDR process in the WINDOWS™ environment may be implemented as follows:

1. Timeout detection: The Video Scheduler component of the Windows Vista graphics stack detects that the GPU is taking more than the permitted quantum time to execute the particular task and tries to preempt this particular task. The preempt operation has a "wait" timeout—the actual "TDR timeout." This step is the "timeout detection" phase of the process. The default timeout period in Windows Vista is 2 seconds. If the GPU cannot complete or preempt the current task within the TDR timeout, then the GPU is diagnosed as hung.

2. Preparation for recovery: The operating system informs the WDDM driver that a timeout has been detected and it must reset the GPU. The driver is told to stop accessing memory and should not access hardware after this time. The operating system and the WDDM driver collect hardware and other state information that could be useful for post-mortem diagnosis.

3. Desktop recovery: The operating system resets the appropriate state of the graphics stack. The Video Memory Manager component of the graphics stack purges all allocations from video memory. The WDDM driver resets the GPU hardware state. The graphics stack takes the final actions and restores the desktop to the responsive state. As mentioned above, some DirectX applications may now render just black, and the user may be required to restart these applications.

Some systems may also address the problem that occurs with frequent and rapidly occurring GPU hangs. Repetitive GPU hangs may indicate that the graphics hardware has not recovered successfully. In these instances, the system must be shut down and restarted to fully reset the graphics hardware. For example, if the operating system detects that a predetermined number of GPU hangs and subsequent recoveries occur within specified time period, then the subsequent GPU hang may be treated as a system bug check. A bug check (also known as a system crash, stop error, or kernel error) occurs when the operating system halts when it reaches a condition where it cannot operate safely.

It is desirable for end users to be provided a consistently rich desktop experience even when GPU hangs occur. If desktop activity refreshes less frequently than every two seconds, a poor end user experience may result. Thus when the graphics hardware causes system hangs, the system may attempt to maintain the user experience by restoring the desktop to the state it was in when the hang occurred. It is desirable that non-graphics-related applications do not lose data and that well-behaved graphics applications continue to function after the recovery.

In order to provide such an experience, the system may continually monitor the work that is being submitted to the GPU. The GPU processes this work and then displays it on the user's screen. On most GPUs, graphics operations take no more than a few milliseconds to complete. Occasionally, however, the GPU encounters a bad hardware state (such as corrupted data in the hardware registers) and can make no further progress. In this situation, the GPU hangs and the screen display freezes. Often users cannot move the mouse, and even typing CTRL+ALT+DEL produces no response. If the problem is not corrected, the system remains in this state. If end users receive no audio feedback from movie or game play, they are likely to hold down the power button to restart the system. Unfortunately, this causes end users to lose all unsaved work.

Thus to address the problem of a GPU hang, a system may allow the GPU, for example, two seconds to finish a work item that should typically take a few milliseconds. If the work item is not completed within two seconds, the system may initiate steps to reset and recover the GPU. After detecting a GPU hang, the system may attempt to restore the original state of the desktop. Restoring a fully functional desktop to end users avoids loss of non-graphics data and also avoids the need for a reboot.

However, a malicious or a rogue application executing in one or more virtual machines can cause a TDR on the host GPU. As mentioned, some systems may reset the system in the case of multiple TDRs. For example, more than five TDRs within a period of one minute may result in a system bugcheck. A malicious user may launch a denial of service (DoS) attack by causing multiple TDRs that would cause multiple or continuous system bugchecks.

In various embodiments, methods and systems are disclosed for mitigating the effects of such a DoS attack by detecting a multiple TDR situation within a short duration, identifying the errant virtual machines, and suspending all rendering ability for that virtual machine or set of virtual machines. While the disclosed embodiments are described in the context of virtual machines, the principles may be extended to the general problem of DoS attacks due to TDRs and bugchecks on any physical machine that includes a GPU. For example, DoS attacks can be generated from web sites directly using GPU rendering. All such scenarios are contemplated by the present disclosure.

In various embodiments, when a TDR occurs, the rendering component or remote desktop virtual graphics manager (e.g., rdvgm process) may identify the virtual machine that caused the TDR by checking the error codes returned by the graphics APIs (e.g., DirectX) and reports the virtual machine to an agent in the remote desktop virtual graphics session manager (e.g., rdvgsm) process. The agent keeps track of the virtual machine or machines causing the TDR and the number of TDRs that have occurred in the last minute. In one embodiment, if three TDRs have occurred in less than one minute, the rendering components of the corresponding errant virtual machines are terminated and an event is logged notifying the host Administrator about the virtual machine state. The errant virtual machine is marked as not being able to be restarted until the virtual machine is turned off. The RemoteFX service ensures that the rendering process cannot be restarted until the virtual machine is shutdown. This process thus prevents a DoS or an attack to bugcheck the host thereby bringing down all the virtual machines and the server. In addition, the process provides auditing ability for the administrator to track the rogue virtual machine or machines and take future action on the user, virtual machine, the rogue application, or a combination of the above.

The method may also be used to prevent DoS attacks due to TDR bugchecks on any physical machine with a consumer GPU. Additionally, the disclosed methods may be used to prevent a single virtual machine or multiple machines acting in concert to bring down a server by executing malicious applications. The virtual machines can be compromised and can launch an attack on a VDI system to overload the host GPU thereby causing TDRs. Multiple TDRs on the host in a short duration will cause the host to bugcheck or crash, thus causing all the virtual machines to crash. The presently disclosed methods detect and prevent this scenario and quarantines the errant virtual machine or virtual machines and notifies the Admin with an event log.

As an example, an attacker can run a Direct3D application in a virtual machine that uses D3D features such as a resource intensive shader program or computationally expensive drawing API calls to consume all the resources available on the physical GPU. Such operations could lead to multiple TDRs on the host GPU, thus leading to a host bugcheck. Such an attack has the possibility of taking down all virtual machines running on the host.

As mentioned, a TDR may be caused by a GPU intensive operation. If a GPU is unresponsive or in a frozen or hung state while processing graphics commands, the video scheduler may detect that the GPU is taking more than the permitted quantum time to execute the particular task and tries to preempt this particular task. If the preemption or the GPU recovery does not occur within a prescribed time, the WDDM driver is notified to reset the GPU. All resources are released and all applications are restarted.

In an embodiment, when the remote desktop virtual graphics manager detects a TDR, the remote desktop virtual graphics manager informs the remote desktop virtual graphics session manager. The remote desktop virtual graphics session manager may then determine which instance of the remote desktop virtual graphics manager caused the TDR. The remote desktop virtual graphics session manager may also keep track of number of TDRs and the source of those TDRs. If the remote desktop virtual graphics session manager encounters a predetermined number of TDRs within a predetermined time period, then the remote desktop virtual graphics session manager may take constraining actions to prevent a system reset or bugcheck. For example, if the remote desktop virtual graphics session manager encounters three TDRs within one minute, the remote desktop virtual graphics session manager may perform the following:

1. If the source of the three TDRs is the same virtual machine, then the remote desktop virtual graphics session manager does not restart the remote desktop virtual graphics manager process corresponding to that virtual machine and logs an event.

2. If the sources of those three TDRs are different, then the remote desktop virtual graphics session manager delays restarting all instances of the remote desktop virtual graphics manager by one minute. Alternatively, the remote desktop virtual graphics session manager could decommission all the errant virtual machines.

3. Alternately, if three TDRs have occurred in less than one minute, the rendering components (the remote desktop virtual graphics session manager) of the corresponding errant virtual machines are terminated and an event is logged notifying the Admin about the virtual machine state.

This process thus prevents a DOS or an attack to bugcheck the host and terminate all the virtual machines and the server.

In one embodiment, the remote desktop virtual graphics manager can explicitly check for TDRs using an API on the device. If a "device lost" error is returned, the remote desktop virtual graphics manager determines that a TDR occurred, but the TDR is not caused by this instance of the remote desktop virtual graphics manager. If a "device hung" error is returned, then it may be determined that a TDR was caused by this instance of the remote desktop virtual graphics manager.

A single instance of the remote desktop virtual graphics manager has multiple devices and any one of the devices may cause a TDR. In this case, the DirectX call on a second device could result in a TDR. However, the remote desktop virtual graphics manager would not be aware if the TDR is caused by itself or other instances of the remote desktop virtual graphics manager. Accordingly, in some embodiments the remote desktop virtual graphics manager will perform a device check on all of its devices.

One DirectX call by the remote desktop virtual graphics manager may cause a TDR. However, the remote desktop virtual graphics manager may not know about this TDR unless it makes another DirectX call. Accordingly, in an embodiment the remote desktop virtual graphics session manager checks with the remote desktop virtual graphics manager explicitly about the TDR.

It is possible for an attacker to create a device, cause a TDR, and deleting the device inside the remote desktop virtual graphics manager. In this case, the remote desktop virtual graphics manager may not be able to determine that it was the one which caused a TDR. Thus in some embodiments a lazy deletion of device objects inside the remote desktop virtual graphics session manager may be implemented. A lazy deletion refers to the deleting by marking an element as deleted rather than erasing it entirely.

In some embodiments, a flush of the GPU is performed. Since rendering operations are not synchronous, the system can wait for the GPU to finish all the operations in its queue and determine if a malicious operation as executed.

Figure 11:
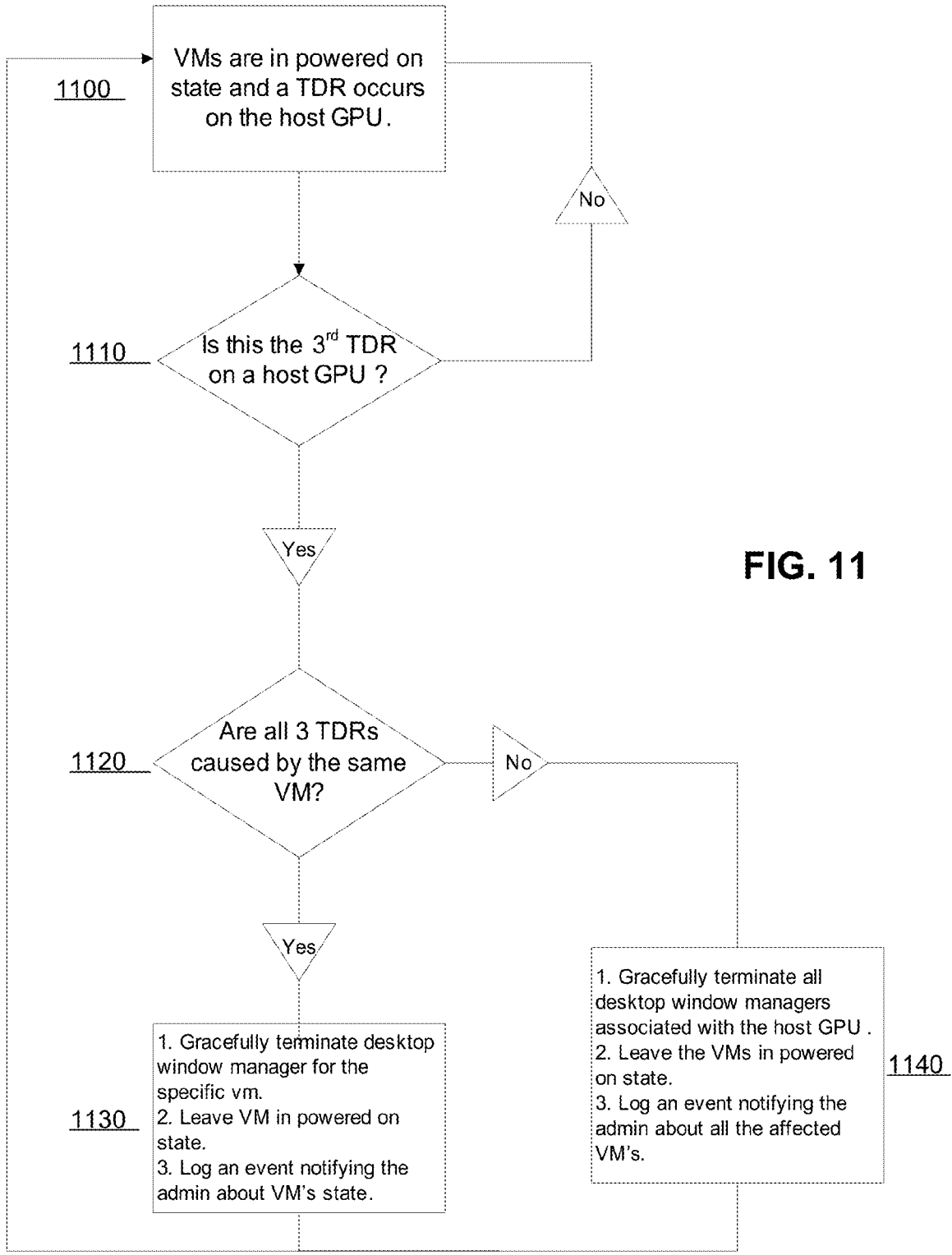
FIG. 11 illustrates an example of an operational procedure for preventing a reset of a host virtual machine due to graphics accelerator timeouts.

Turning to FIG. 11, illustrated is an example embodiment of a method for preventing a reset of a host virtual machine due to graphics accelerator timeouts. In operation 1100, all virtual machines may be executing in the powered on state and a TDR is determined to have occurred on the host GPU. In operation 1110, it is determined whether this is the third TDR on the host GPU. If this is not the third TDR, then the method continues at operation 1100 to determine a subsequent TDR.

When a third TDR has been detected, in operation 1120 the method determines whether all three TDRs were caused by the same virtual machine. If the three TDRs were not caused by the same virtual machine, then in operation 1140 all of the remote desktop virtual graphics managers associated with the host GPU are gracefully terminated. The virtual machines are left in the powered on state, and an event notifying the administrator is logged.

If all three TDRs are caused by the same virtual machine, then in operation 1130 the remote desktop virtual graphics manager for the specific identified virtual machine is gracefully terminated. The virtual machine is left in the powered on state, and an event notifying the administrator is logged.

Figure 12:
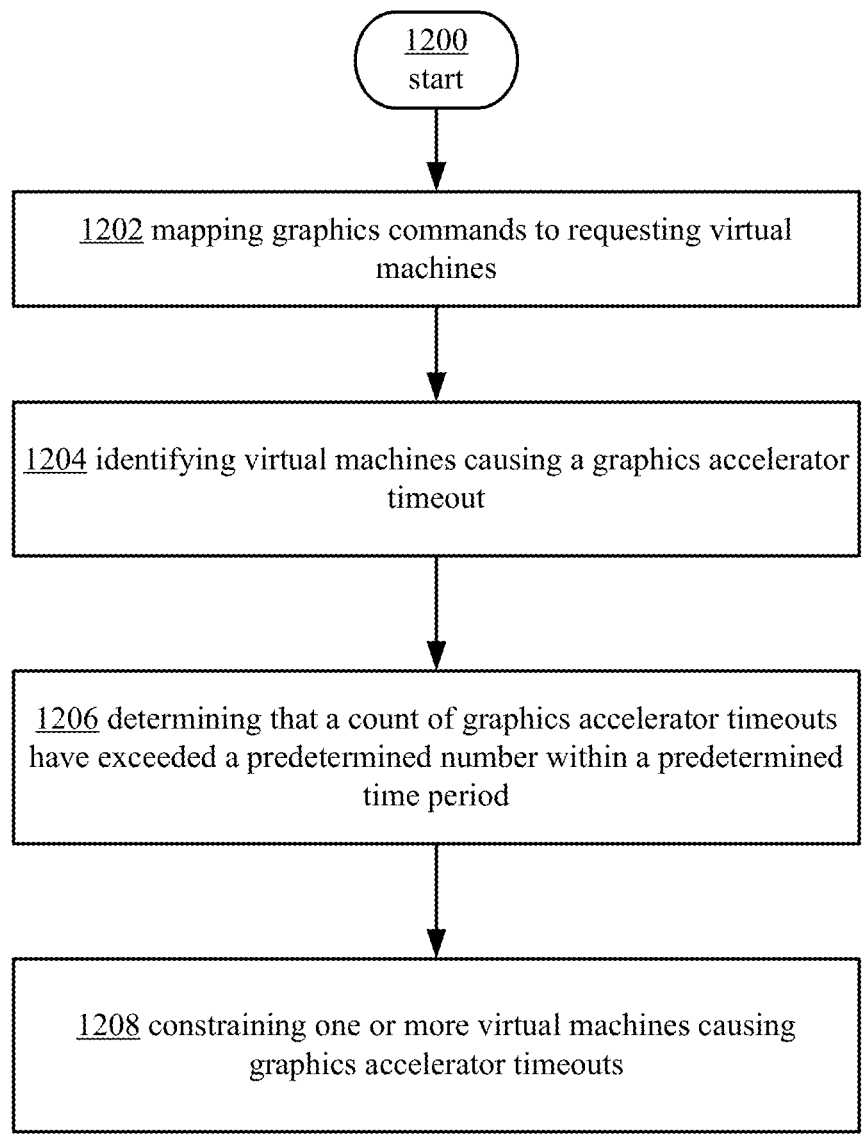
FIG. 12 illustrates an example of an operational procedure for preventing a reset of a host virtual machine due to graphics accelerator timeouts.

FIG. 12 depicts an exemplary operational procedure for preventing a reset of a host virtual machine due to graphics accelerator timeouts including operations 1200, 1202, 1204, 1206, and 1208. Referring to FIG. 12, operation 1200 begins the operational procedure and operation 1202 illustrates mapping graphics commands to requesting virtual machines. Operation 1204 illustrates identifying virtual machines causing a graphics accelerator timeout. Operation 1206 illustrates determining that a count of graphics accelerator timeouts have exceeded a predetermined number within a predetermined time period. Operation 1208 illustrates constraining one or more virtual machines causing graphics accelerator timeouts.

Figure 13:
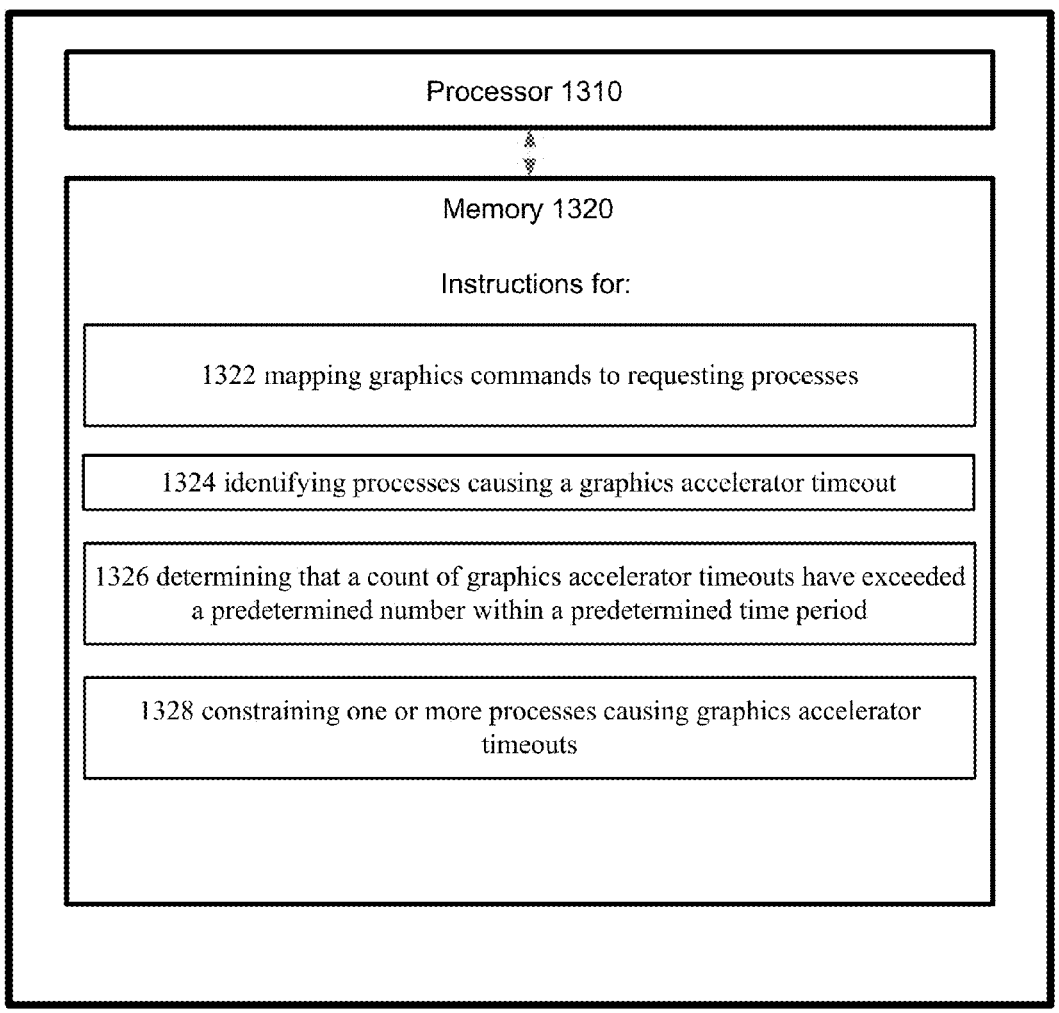
FIG. 13 illustrates an example system for preventing a reset of a host virtual machine due to graphics accelerator timeouts.

FIG. 13 depicts an exemplary system for preventing a reset of a computing device due to graphics accelerator timeouts as described above. Referring to FIG. 13, system 1300 comprises a processor 1310 and memory 1320. Memory 1320 further comprises computer instructions configured to preventing a reset of a computing device due to graphics accelerator timeouts. Block 1322 illustrates mapping graphics commands to requesting processes. Block 1324 illustrates identifying processes causing a graphics accelerator timeout. Block 1326 illustrates determining that a count of graphics accelerator timeouts have exceeded a predetermined number within a predetermined time period. Block 1328 illustrates constraining one or more processes causing graphics accelerator timeouts.

Any of the above mentioned aspects can be implemented in methods, systems, computer readable media, or any type of manufacture. For example, a computer readable medium can store thereon computer executable instructions for preventing a reset of a host virtual machine due to GPU TDRs. Such media can comprise a first subset of instructions for mapping graphics commands to requesting graphics processes; a second subset of instructions for identifying virtual machines causing a GPU TDR based on said mapping; a third set of instructions for determining that a count of GPU TDRs have exceeded a predetermined number within a predetermined time period; and a fourth set of instructions for constraining one or more virtual machines causing GPU TDRs. It will be appreciated by those skilled in the art that additional sets of instructions can be used to capture the various other aspects disclosed herein, and that the four presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. A method for preventing a reset of a host virtual machine due to graphics accelerator timeouts, the method comprising:
    mapping graphics commands to virtual machines requesting the graphics commands, the graphics commands being executed by a graphics accelerator;
    based on the mapping, identifying virtual machines that have requested graphics commands causing at least one timeout detection and recovery process associated with the graphics accelerator;
    determining that a number of timeout detection and recovery processes have exceeded a predetermined number within a predetermined time period; and
    constraining the identified virtual machines.

2. The method of claim 1, wherein when a single virtual machine caused the number of timeout detection and recovery processes, said constraining comprises not restarting the single virtual machine.

3. The method of claim 1, wherein when different virtual machines caused the number of timeout detection and recovery processes, said constraining comprises delaying restart of the different virtual machines for a predetermined delay.

4. The method of claim 3, wherein said graphics accelerator is a graphics processing unit (GPU).

5. The method of claim 1, wherein when different virtual machines caused the number of timeout detection and recovery processes, said constraining comprises terminating video rendering components of the different virtual machines.

6. The method of claim 5, wherein said terminating comprises lazy deletion.

7. The method of claim 1, wherein said identifying comprises flushing the graphics accelerator.

8. The method of claim 1, wherein said predetermined number within a predetermined time period are determined as a function of a number of timeout and detection recovery events that cause a reset of the host virtual machine.

9. A computing system comprising:
    a computing device comprising at least one processor;
    a graphics accelerator;
    a memory communicatively coupled to said processor when said system is operational;
    said memory having stored therein computer instructions that upon execution by the at least one processor cause:
        mapping graphics commands to processes requesting the graphics commands;
        based on the mapping, identifying processes causing graphics accelerator timeouts associated with a denial of service attack;
        determining that a count of graphics accelerator timeouts have exceeded a predetermined number within a predetermined time period, the predetermined number and the predetermined time period selected so as to indicate a denial of service attack; and
        constraining one or more processes causing graphics accelerator timeouts that have exceeded the predetermined number within the predetermined time period.

10. The system of claim 9, wherein when a single process caused the count of the graphics accelerator timeouts, said constraining comprises not restarting the single process.

11. The system of claim 9, wherein when different processes caused the count of the graphics accelerator timeouts, said constraining comprises delaying restart of the different processes for a predetermined delay.

12. The system of claim 9, wherein when different processes caused the count of the graphics accelerator timeouts, said constraining comprises terminating video rendering components of the different processes.

13. The system of claim 12, wherein said terminating comprises lazy deletion.

14. The system of claim 9, wherein said identifying comprises flushing the graphics accelerator.

15. The system of claim 9, wherein said graphics accelerator is a graphics processing unit (GPU).

16. A computer readable storage device storing thereon computer executable instructions for preventing a reset of a host virtual machine due to GPU TDRs, said instructions for:
    mapping graphics commands to graphics processes requesting the graphics commands;
    based on the mapping, identifying virtual machines causing a GPU TDR based on said mapping;
    determining that a count of GPU TDRs have exceeded a predetermined number within a predetermined time period; and
    constraining one or more virtual machines causing GPU TDRs that have exceeded the predetermined number within the predetermined time period.

17. The computer readable storage device of claim 16, wherein when a single virtual machine caused the count of the GPU TDRs, said constraining comprises not restarting the single virtual machine.

18. The computer readable storage device of claim 16, wherein when different virtual machines caused the count of the GPU TDRs, said constraining comprises delaying restart of the different virtual machines for a predetermined delay.

19. The computer readable storage device of claim 16, wherein when different virtual machines caused the count of the GPU TDRs, said constraining comprises terminating video rendering components of the different virtual machines.

20. The computer readable storage device of claim 16, wherein said predetermined number within a predetermined time period are determined as a function of a number of TDRs that cause a system bugcheck of the host virtual machine.

* * * * *